Patented Dec. 1, 1931

1,834,455

UNITED STATES PATENT OFFICE

ERLING JOHNSON, OF ODDA, NORWAY, ASSIGNOR TO FIRM: ODDA SMELTEVERK A/S, OF ODDA, NORWAY

PROCESS OF MANUFACTURING PHOSPHORIC ACID AND SOLUBLE PHOSPHATES

No Drawing. Application filed January 11, 1930, Serial No. 420,287, and in Norway January 14, 1929.

In my application Ser. No. 391,506 I have described a process for converting phosphate rock and similar phosphate material into soluble compounds and of separating the content of lime and of phosphoric acid of the phosphate material. According to said application the phosphate material is by means of nitric acid transformed into a solution containing calcium nitrate and phosphoric acid from which solution by suitable cooling the calcium nitrate is crystallized out as $Ca(NO_3)_2.4H_2O$ while a mother liquor results, which contains the phosphoric acid of the phosphate material and the rest of lime from said material together with a surplus, if any, of nitric acid.

My present invention relates to a process for utilizing this mother liquor for manufacturing phosphoric acid or water-soluble phosphates free from nitric acid.

For this purpose I remove the nitric acid by distillation before or after further treatment of the mother liquor. The distillation is preferably carried out under vacuum by sufficiently low temperature in order to avoid undesired side-reactions.

After direct distillation of nitric acid from the mother liquor it is possible to obtain from the liquor water soluble mono-calcium phosphate or a mixture of mono-calcium phosphate and free phosphoric acid, just according to the composition of said mother liquor. If the latter contains one molecule of $Ca(NO_3)_2$ to two molecules of $H_3PO_4$ mono-calcium phosphate may immediately be obtained after distillation of the nitric acid:

$$Ca(NO_3)_2 + 2H_3PO_4 = Ca(H_2PO_4)_2 + 2HNO_3.$$

If the mother liquor contains less calcium than represented by this equation a mono-calcium phosphate with some free phosphoric acid will result. Again, with greater quantities of calcium nitrate in the mother liquor products are obtained which contain calcium nitrate, mono-calcium phosphate and di-calcium phosphate in varying proportions.

The phosphoric acid products which result after distillation of the nitric acid may be worked into free phosphoric acid, ammonium phosphates, alkali phosphates, etc.

Phosphoric acid is obtained by reaction with sulphuric acid of appropriate grade and in suitable quantities. By reaction with ammonium sulphate or alkali sulphates corresponding phosphates result. The calcium sulphate, precipitated by these reactions, is removed by filtration and may be utilized in known manner for producing fresh quantities of ammonium sulphate, which again may be used for treating further quantities of phosphoric acid solution.

As already mentioned the calcium present may first be precipitated as sulphate. Afterwards the nitric acid may be distilled off in some suitable way. So for instance phosphoric acid is very simply obtained by precipitation of calcium by means of the calculated quantity of sulphuric acid and subsequent distillation of the nitric acid set free. For this purpose only a fraction of the quantity of sulphuric acid is necessary, which is required in the usual production of phosphoric acid from phosphate rock and sulphuric acid.

Example

To 100 parts of the mother liquor obtained according to the process described in application Ser. No. 391,506 and containing 23 per cent $P_2O_5$, 5.54 per cent CaO and 2.74 per cent nitrogen in the form of calcium nitrate and free nitric acid equivalent to 2 per cent nitrogen, and consequently a total content of 4.74 per cent nitrogen, 19.5 parts of sulphuric acid of 50 per cent were added. The precipitated gypsum was filtered off and washed. The filtrate was evaporated and the nitric acid distilled off under vacuum. 40 parts of phosphoric acid were obtained, practically free from nitric acid and containing 57.5 per cent $P_2O_5$.

A small quantity of gypsum, which precipitates during evaporation may be separated from the phosphoric acid by filtration or in a centrifugal machine. A further purification of the phosphoric acid may be effected in the usual manner.

When the process is carried out commercially the distillation of the nitric acid may be combined with a concentration of the acid, and the nitric acid so obtained may be used together with fresh quantities of acid in the treatment of phosphate rock according to the process of my patent application 391,506.

The nitric acid immediately distilling off may even most advantageously be introduced into a nitric acid tower system as used in producing nitric acid from nitrogen oxides. The phosphoric acid may in known manner be utilized for production of mono- or di-ammonium phosphate by neutralization with ammonia or ammonium carbonate, respectively for production of alkali phosphate by neutralization with alkali carbonates or caustic alkalis. However the working up of the phosphoric acid may be effected in any other known manner.

In similar manner as phosphoric acid is produced in the example given above, mono-ammonium phosphate and mono-alkali phosphates may be prepared by addition of ammonium sulphate or alkali sulphates to the mother liquor, filtration of the gypsum precipitated, evaporation of the filtered solution and distillation of the nitric acid f. inst. according to the following equations:

(1) $Ca(NO_3)_2 + 2H_3PO_4 + (NH_4)_2SO_4 =$
$2NH_4NO_3 + 2H_3PO_4 + CaSO_4$

The calcium sulphate precipitated is filtered off and washed. The filtrate is evaporated under simultaneous distillation of the nitric acid.

(2) $2NH_4NO_3 + 2H_3PO_4 =$
$2(NH_4)H_2PO_4 + 2HNO_3$

The gypsum precipitated may be utilized in known manner for production of fresh quantities of ammonium sulphate for use in the process.

Instead of by sulphuric acid or sulphates the calcium of the mother liquor may be precipitated by means of high grade nitric acid after evaporation of the phosphoric acid solution to mono-calcium phosphate or to a solution of suitable grade is effected. This operation may be achieved in the following steps:

(1) $Ca(NO_3)_2 + 2H_3PO_4 =$
$Ca(H_2PO_4)_2 + 2HNO_3$

Water and nitric acid are distilled off so that solid mono-calcium phosphate or a sufficiently concentrated mixture of phosphoric acid and mono-calcium phosphate or mono- and di-calcium phosphate beside some calcium nitrate results. It is evident that it is not necessary in this step of the process to remove all of the nitric acid present.

The solid mono-calcium phosphate or the mixtures obtained are then stirred out with an excess of high grade nitric acid of 80 per cent or more. A mixture of free phosphoric and nitric acid results besides calcium nitrate which is insoluble in the strong nitric acid. In fact in this case a reaction is performed which is quite the reverse of that represented by Equation (1) viz:

(2) $Ca(H_2PO_4)_2 + 2HNO_3 =$
$Ca(NO_3)_2 + 2H_3PO_4$

At a suitable low temperature the calcium nitrate is completely separated out from the remaining liquor of strong phosphoric acid and nitric acid.

The calcium nitrate is filtered off and is washed with concentrated nitric acid. The nitrate is subsequently worked up in known manner, preferably together with the calcium nitrate obtained by crystallization from the solution of phosphate rock in nitric acid according to my patent application Ser. No. 391,506. The filtrate, a mixture of nitric acid and phosphoric acid, is freed from nitric acid by distillation, whereby phosphoric acid of up to 90% and free from nitric acid remains.

The process above described has several merits as compared with previously proposed methods, according to which phosphate rock is treated directly with high grade nitric acid (of more than 80 per cent). In my process I use a solution, which is obtained by treating phosphate rock with nitric acid of moderate grade and from which a very considerable part of the calcium is removed by crystallization as calcium nitrate according to my patent application Ser. No. 391,506. As this solution is largely deprived of calcium, only relatively small quantities of high grade nitric acid are necessary to precipitate the rest of calcium still present. And as the quantity of calcium nitrate precipitated by nitric acid in my process is only a small one, also a far less quantity of high grade nitric acid is necessary for precipitation and for washing the phosphoric acid from the calcium nitrate.

As already mentioned it may be sufficient to remove only the main part of water or a sufficient quantity of dilute nitric acid from the solution before the high grade nitric acid is added. An evaporation until solid dry mono-calcium phosphate is formed is not strictly necessary.

*Example*

100 parts of the phosphoric acid containing mother liquor resulting from the solution of phosphate rock in nitric acid according to my patent application Ser. No. 391,506 and from which calcium nitrate was largely crystallized out, were evaporated until the solution contained 40 per cent $P_2O_5$. Some nitrate nitrogen was still present. The concentrated solution was mixed with 50 parts of nitric acid of specific gravity 1.5. After the reaction was finished and calcium nitrate had separated out, the latter was filtered off and was washed with 25 parts of nitric acid of the same grade. Some 20 parts of calcium nitrate were obtained. The filtrate was evaporated and yielded 28 parts of phosphoric acid of 80 per cent, practically free from nitric acid.

The separation of the calcium nitrate from the liquid is preferably effected in a centrifugal machine.

I claim:

1. Process of manufacturing phosphoric acid and water-soluble phosphates from phosphate rock and similar phosphate material, comprising converting the phosphate material by means of nitric acid of preferably 45-65 per cent into a solution of free phosphoric acid and calcium nitrate, crystallizing calcium nitrate from the solution so obtained by appropriate cooling, separating the crystallized calcium nitrate from the solution, subjecting the mother liquor to distillation to remove nitric acid and working the remaining liquor on phosphoric acid products.

2. Process of manufacturing phosphoric acid from phosphate rock and similar phosphate material, comprising converting the phosphate material by means of nitric acid of less than 80 per cent, preferably of 45-65 per cent into a solution of free phosphoric acid and calcium nitrate, crystallizing calcium nitrate from the solution separating the crystallized nitrate, adding to the remaining liquor sulphuric acid to precipitate the calcium as calcium sulphate removing the calcium sulphate by filtration and subjecting the filtrate to distillation of nitric acid.

3. Process of manufacturing water soluble phosphates from phosphate rock and similar phosphate material, comprising converting the phosphate material by means of nitric acid, preferably of 45-65 per cent into a solution of free phosphoric acid and calcium nitrate, crystallizing calcium nitrate from the solution, separating the crystallized nitrate, adding to the remaining mother liquor ammonium sulphate to precipitate the calcium as calcium sulphate, removing the calcium sulphate by filtration and subjecting the filtrate to distillation for removing nitric acid.

4. Process of manufacturing water-soluble phosphates from phosphate rock and similar phosphate material, comprising converting the phosphate material by means of nitric acid, preferably of 45-65 per cent into a solution containing free phosphoric acid and calcium nitrate, crystallizing calcium nitrate from the solution, separating the crystallized nitrate, adding to the remaining mother liquor an alkali sulphate to precipitate the calcium as calcium sulphate, removing the calcium sulphate by filtration and subjecting the filtrate to distillation for removing nitric acid.

In testimony that I claim the foregoing as my invention I have signed my name.

ERLING JOHNSON.